(No Model.)
J. A. ESCO & E. G. ROANE.
SEED PLANTER AND FERTILIZER DISTRIBUTER.
No. 329,378. Patented Oct. 27, 1885.
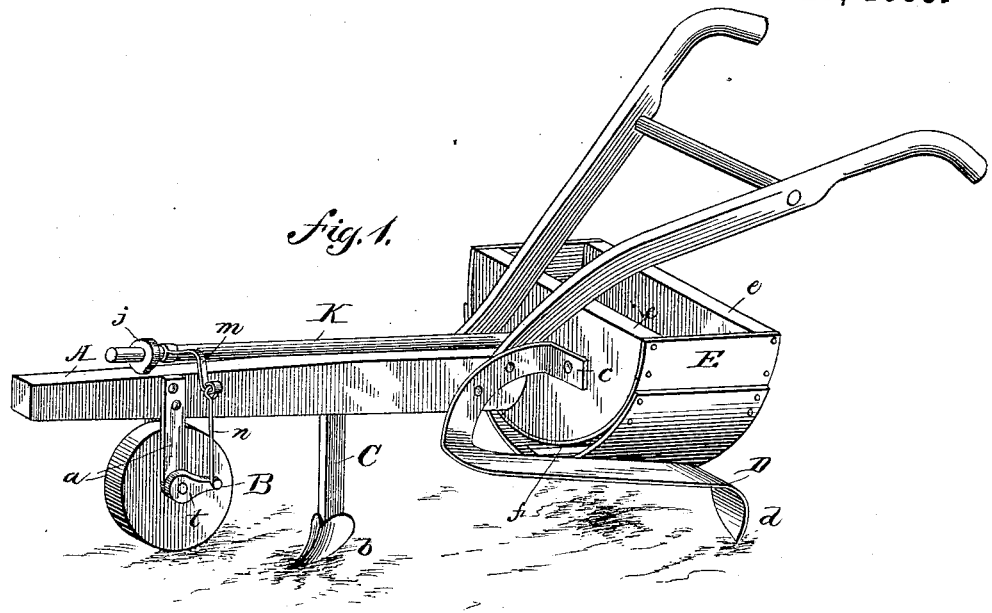
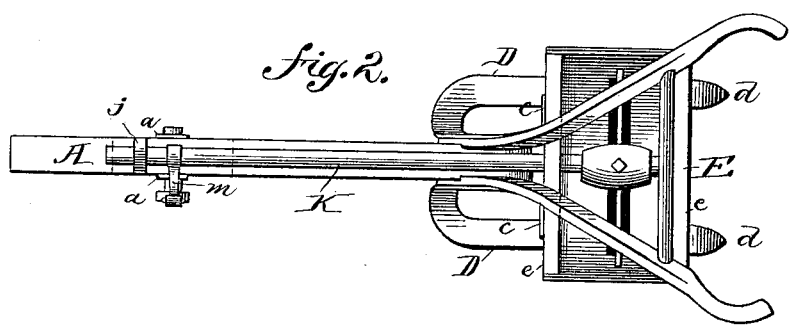
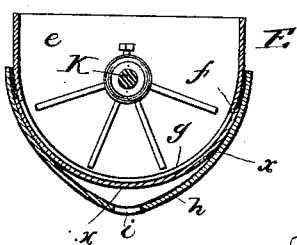

UNITED STATES PATENT OFFICE.

JOSEPH A. ESCO, OF CRAWFORD, AND EDWARD G. ROANE, OF ATHENS, GEORGIA.

SEED-PLANTER AND FERTILIZER-DISTRIBUTER.

SPECIFICATION forming part of Letters Patent No. 329,378, dated October 27, 1885.

Application filed August 21, 1884. Serial No. 141,160. (No model.)

*To all whom it may concern:*

Be it known that we, JOSEPH A. ESCO and EDWARD G. ROANE, citizens of the United States, and respectively residing at Crawford, Oglethorpe county, Georgia, and Athens, Clarke county, Georgia, have invented certain new and useful Improvements in Seed-Planters and Fertilizer-Distributers, of which the following is a specification.

Our invention relates to seed-planters and fertilizer-distributers, and has for its object to greatly improve the construction and operation of such machines, so as to render them positive in their action of pulverizing or mixing the fertilizer or seed and in feeding it to the point of discharge, whereby a more even distribution of fertilizer or grain is obtained and the amount distributed easily controlled.

To these ends our invention consists in the peculiar construction and organization of the parts of the implement, as fully set forth hereinafter and illustrated in the accompanying drawings, in which—

Figure 1 is a perspective view of a planter and distributer embodying our invention. Fig. 2 is a plan view thereof, and Fig. 3 a central cross-section of the mixing and distributing hopper.

The letter A designates the beam of the distributer, which is of the usual form, and is supported at or near its forward end by a wheel, B, journaled in standards $a\ a$, bolted or otherwise secured to the sides of the beam. About midway of the length of the beam, and secured thereto in any suitable manner, is a standard, C, carrying at its lower end a plow-point, $b$, as usual. The rear end of the beam A is supported in a horizontal position, or nearly so, by covering-blades D D, bolted to the sides thereof. These blades are curved at their point of attachment with the beam, as shown, and at their upper ends are bent outwardly at right angles to form ears $c\ c$, to which is secured a mixing and distributing hopper, E. The downwardly-extending portion of the blades D D is curved outwardly a sufficient distance to give them the desired spread, and they are then curved to the rear below the hopper E, at the rear edge of which they terminate in downwardly-extending shovel-shaped points $d\ d$. Suitable handles, G G, by which the movements of the implement may be controlled, are secured to the beam A in advance of the hopper E, and extend rearwardly over the latter within convenient reach of the operator. The hopper E is of an approximately semi-cylindrical form in cross-section, and consists of end pieces, $e\ e$, which are connected by a metal or other bottom, $f$, provided with a slot or feed-opening, $g$, of any suitable size, and arranged in a line parallel with the end pieces, $e\ e$. Below the bottom $f$, and secured thereto near the upper edges of the hopper, is a second or supplemental bottom, $h$, which is also provided with a feed opening, $i$, but in a line running crosswise of the opening $g$ in the bottom $f$ and in line with the beam A. The outline of the supplemental bottom $h$ is approximately that of a semi-ellipse with the opening $i$ at its lowest point, and so arranged in relation to the bottom $f$ that as the contents of the hopper is fed through the opening $g$ it passes down the sides of the supplemental bottom $h$, where it is discharged through the feed-opening therein. By this construction it will be seen that as the feed-opening $i$ in the bottom $h$ is parallel with the beam A or direction of draft the contents of the hopper as it is permitted to pass therefrom is dropped directly into the furrow, so that the liability of waste of grain or fertilizer by its being spread along the sides of the furrow is avoided. A slide, $x$, working in suitable keepers on the under side of the bottom $f$, serves to control the discharge of material through the feed-opening $g$, and thus to regulate the quantity distributed.

Above the beam A, and journaled in a suitable bearing, $j$, near the forward end thereof, is a rock-shaft, K, extending at its rear end through bearings in the ends $e\ e$ of the hopper, and carrying a hub, L, keyed or otherwise fastened to the shaft within and about midway between the end walls of the hopper. Projecting from the center of the hub L are radially-arranged arms $p$, of such a length as to reach within a short distance of the bottom $f$ and in line with the feed-opening $g$.

Fixed upon and projecting laterally from the shaft K, centrally above the wheel B, is a lever, $m$, connected at its outer end by a pitman, $n$, to a crank-arm, $t$, fixedly secured upon the end of the axle of said wheel. By this construction the revolution of the wheel B imparts a rocking motion to the shaft K, and thus by the corresponding movements of the stirrer pulverizes and intimately stirs or mixes the contents of the hopper E, and feeds it to the point of discharge.

From the foregoing the operation of the implement will be apparent. When the draft is applied to the forward end of the beam A, and the implement advances, the furrow for the reception of the grain or fertilizer is opened by the plow b. As the wheel B revolves, the shaft K is given a rocking motion, thus imparting a corresponding movement to the stirrer within the hopper E, pulverizing or mixing its contents and feeding it to the point of discharge into the furrow. As this operation progresses, the grain or fertilizer in the furrow is covered over by the covering-blades D D.

We claim—

1. The combination, in a seed-planter or fertilizer-distributer, of a beam supported at its forward end by a wheel and at its opposite end by covering-blades, a mixing-hopper secured to the upper ends of said blades, and a stirrer arranged within said hopper and adapted to be rocked by the movements of the wheel, substantially as set forth.

2. The combination, with the beam and supporting-wheel at its forward end, of covering-blades secured to and supporting the rear end of the beam and terminating at their upper ends in ears c, a mixing-hopper secured to said ears, a rock-shaft arranged parallel with and journaled upon said beam, a stirrer supported by said shaft within the hopper, and connections between said shaft and supporting-wheel whereby the stirrer is rocked by the movements of the wheel, substantially as set forth.

3. The combination, with the beam, of the supporting-wheel, plow b, covering-blades, shaped as shown, mixing-hopper supported by the upper ends of said blades in rear of the beam, said hopper being provided with a double bottom, in each wall of which is a feed-opening, the one running at right angles to the other, a regulating-slide arranged between the walls of said bottom, and means, substantially as shown, for stirring the contents of the hopper, as set forth.

In testimony whereof we have signed our names to this specification in the presence of two subscribing witnesses.

JOSEPH A. ESCO.
EDWARD G. ROANE.

Witnesses:
THOS. BAILY,
L. SCHEVENELL.